United States Patent [19]
Kudlacik

[11] 3,758,842
[45] Sept. 11, 1973

[54] FIELD EXCITATION CIRCUIT FOR A DYNAMOELECTRIC MACHINE

[75] Inventor: Henry W. Kudlacik, Schenectady, N.Y.

[73] Assignee: General Electric Company, Schenectady, N.Y.

[22] Filed: May 30, 1972

[21] Appl. No.: 257,762

[52] U.S. Cl. .............. 322/25, 322/27, 322/28, 322/73, 322/75, 322/90
[51] Int. Cl. ............................................. H02p 9/30
[58] Field of Search ................ 322/25, 27, 28, 59, 322/73, 75, 79, 90; 323/80, 86, 87

[56] References Cited
UNITED STATES PATENTS

| 3,254,293 | 5/1966 | Steinbruegge et al. | 322/25 X |
| 3,302,097 | 1/1967 | Bobo et al. | 322/25 |
| 3,184,675 | 5/1965 | Macklem | 323/86 X |
| 3,479,543 | 11/1969 | Drexler | 322/25 |

Primary Examiner—J. D. Miller
Assistant Examiner—H. Huberfeld
Attorney—William C. Crutcher et al.

[57] ABSTRACT

A field excitation circuit utilizing a three-winding excitation transformer in each phase to supply the excitation power of a dynamoelectric machine. The field excitation circuit includes a variable reactance in series with one winding of each three-winding excitation transformer. The variable reactance comprises a reactor with silicon-controlled rectifiers connected in an inverse parallel relationship. The power output of the excitation system is adjusted to the required value by varying the reactance.

9 Claims, 1 Drawing Figure

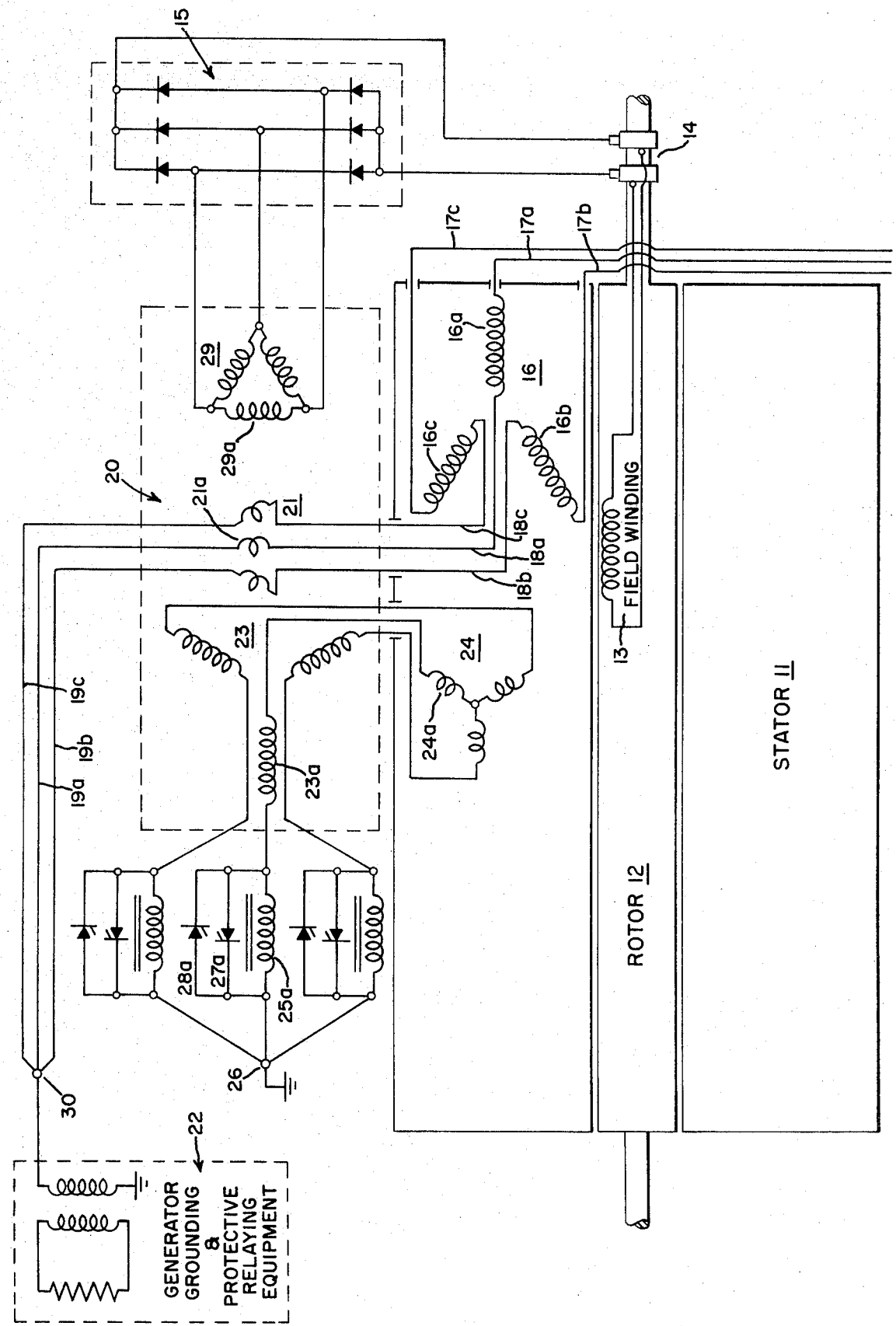

3,758,842

FIELD EXCITATION CIRCUIT FOR A DYNAMOELECTRIC MACHINE

BACKGROUND OF THE INVENTION

1. Field of the Invention

This invention relates to dynamoelectric control circuits, and, more particularly, to excitation systems for dynamoelectric machines having a static excitation power supply.

2. Description of the Prior Art

Static excitation systems for dynamoelectric machines have typically required excitation circuitry regulating the entire output of a transformer. This usually results in high current rated silicon-controlled rectifiers connected across the output of an excitation transformer or connected in series with the secondary winding of the excitation transformer. Typical of such prior art control circuits are U. S. Pat. No. 3,388,315 issued to C. J. Yarrow which teaches the half cycle control of the entire output of a two-winding transformer by connecting a silicon-controlled rectifier in series with the secondary winding of the transformer, and U. S. Pat. No. 3,369,171 issued to L. J. Lane and assigned to the present assignee which teaches the half cycle control of the entire output of a transformer by either connecting silicon-controlled rectifiers across the output of the transformer or placing them across parts of a rectifying bridge which is in turn connected to the output of the transformer.

The disadvantages inherent in excitation circuitry regulating the entire output of a transformer wherein high power devices are utilized have been substantially eliminated by this invention, by providing an excitation control circuit which gives full cycle control of the amount of reactance in series with one winding of a three-winding excitation transformer.

BRIEF SUMMARY OF THE INVENTION

It is therefore an object of this invention to provide an improved excitation circuit during normal operating conditions.

It is another object of this invention to provide an excitation circuit which will reduce the amount of current in a winding of the excitation transformer.

It is a further object of this invention to provide a variable reactance in series with one winding of an excitation transformer and, in doing so, utilize relatively low-rated current switching devices.

Briefly stated, in accordance with an aspect of this invention, the foregoing objects are achieved by providing a field excitation circuit in the form of a variable reactance connected in series with each phase of one of the windings of the excitation transformer. The variable reactance comprises a reactor connected in series with each phase of one winding of the excitation transformer and silicon-controlled rectifiers connected in an inverse parallel relationship across each reactor.

The subject matter which is regarded as the invention is particularly pointed and distinctly claimed in the concluding portion of the specification. The invention, however, both as to organization and method of operation together with further objects and advantages thereof, may best be understood by reference to the following description when taken in connection with the accompanying drawings in which:

BRIEF DESCRIPTION OF THE DRAWING

The FIGURE is a simplified schematic representation of the improved direct current field excitation circuit used in conjunction with a dynamoelectric machine in accordance with this invention.

DETAILED DESCRIPTION

In the following embodiment, a three phase circuit is shown; however, it is to be understood that the teachings of this invention are applicable to a single phase or other multiphase equipment. Also, in referring to a single phase winding, it is to be understood that the same is applicable to the other phase windings, which may be displaced in phase relationship to the winding referred to.

Referring now to the FIGURE of the drawing, a dynamoelectric machine is schematically depicted as including an electromagnetic stator 11 and a rotor 12. Disposed on the rotor 12 is a rotating field winding 13. The field winding 13 is connected to the direct current output of a three phase bridge connected rectifier bank 15 through a slip ring and brush arrangement 14, as is well known in the art.

Disposed in slots in the electromagnetic stator core 11 in a conventional manner, is a multiphase main armature winding 16 comprising the three phase windings 16a, 16b, and 16c used illustratively herein. Each phase winding, such as 16a, may in actuality include parallel connected windings, but is illustrated simply as a single winding having a terminal lead 17a and a neutral lead 18a.

The neutral lead 18a is connected to a single turn first winding 21a of an excitation transformer 20 indicated schematically by a dashed enclosure. Although the neutral lead 18a simply makes one pass through a laminated core of the excitation transformer 20, to form a one-turn winding, this winding is depicted symbolically as multiphase first winding 21. After the first winding 21a, and its counterpart for each of the other phases, pass through the core of the excitation transformer 20, the leads 19a, 19b, and 19c are connected together at a common neutral connection point 30, which is connected to generator grounding and protective relaying equipment 22 in a manner well known in the art.

The excitation transformer 20 is provided with a second multiphase winding 23, winding 23a being illustrative of all the similar windings, to which current is supplied by a supplementary winding in the form of a multiphase supplementary windings 24 in the stator core 11, winding 24a being illustrative of all the similar windings. Each phase conductor of the supplementary excitation winding 24, such as 24a, is placed in the proper slot to give the desired phase relationship with respect to a phase winding, such as 16a of the main armature winding 16. Each phase of the multiphase supplementary winding 24, such as 24a, is connected at its output to a corresponding winding, such as 23a of the second multiphase winding 23. The second multiphase winding 23 is in turn connected in series with a reactor 25a to a grounded neutral or common connection 26.

Means for controlling the amount of current through reactor 25a is provided by thyristors or inverse parallel silicon-controlled rectifiers 27a and 28a connected in parallel with reactor 25a.

Each phase of the first winding 21 and the second winding 23 are operatively disposed on a common core in the excitation transformer 20 so as to generate a voltage in a corresponding phase winding of a delta-connected multiphase third winding 29. That is, each corresponding phase of the first winding 21, second winding 23, and third winding 29 are magnetically coupled to one another in the excitation transformer 20 in a manner well known in the art. The output leads from the third winding 29 are connected as a three phase input to the rectifier bank 15, the output of which supplies the current to field winding 13.

This type of excitation system, with the exception of the thyristors connected in inverse parallel relationship across reactors 25, is more fully described in a copending application Ser. No. 155,511 filed in the names of K. F. Drexler and H. W. Kudlacik on June 22, 1971 and assigned to the present assignee.

In operation, the first winding 21 of the excitation transformer 20 is connected between the main armature winding 16 and leads 19 to the neutral connection 30 and ground.

The multiphase supplementary winding 24 is responsive to the synchronous flux or virtual voltage produced by the rotating field winding 13. The output of the supplementary winding 24 is connected in series with the second winding 23, which in turn is connected in series with reactor 25 to complete the circuit.

First winding 21 and second winding 23 together create flux linkage with the third winding 29. Third winding 29 developes a voltage substantially responsive to the flux developed by current flowing in the first winding 21 and second winding 23. The voltage from the third winding 29 is supplied to the input of rectifier bank 15.

The function of reactor 25 which is connected in series with each phase of the second winding 23, is to stabilize the operation of the entire system over an extremely wide range of generator terminal conditions, both steady state and transient, and to provide high voltage protection to its associated silicon-controlled rectifiers 27 and 28. More particularly, the combination of reactor 25a and the silicon controlled rectifiers 27a and 28a, respond as a variable reactance connected in series with each phase of the second winding 23a depending upon the firing angle of the silicon-controlled rectifiers 27a and 28a. Varying the reactance in series with winding 23a causes the vector current in winding 23a to change and since the vector ampere turns in winding 29a must equal the vector sum of the ampere turns in winding 21a and 23a during steady state conditions when the magnetizing current is neglected, it can be seen that the output of winding 29a can be controlled.

If the reactor 25 is eliminated the inverse parallel silicon-controlled rectifiers such as 27a and 28a will respond as a variable reactance depending upon the firing angle, and stable operation over a wide range of generator terminal conditions can be obtained. However, the peak voltage across the silicon-controlled rectifiers will be high.

Triggering circuitry well known in the art will, in combination with the silicon-controlled rectifiers, individually, or in oppositely oriented pairs, control the amount of current through their associated reactor in response to a control, not shown. The control is characteristic of the operating condition of the associated dynamo-electric machine and will generally synchronize the firing angle of the control means 27 and 28 with predictable characteristics of the output of the dynamoelectric machine.

In addition to having the capability to control the power output of winding 29 during steady state conditions to that required by the generator, this control circuit has the ability to provide higher field forcing during abnormal terminal conditions over the entire power factor range. As an example, when the synchronous flux is high and a large amount of power is available from winding 24 such as when the generator is operating in the over-excited region or lagging power factor, a small reactance would permit a large transfer of power from winding 24 to winding 29.

As another example, when the generator is operating at low synchronous flux very low terminal voltage and high terminal current, very little or no power is available from winding 24, but a large amount of power is available from winding 21. In this case, a large reactance would permit a large transfer of power from winding 21 to winding 29. Therefore, controlling reactors 25 to function as variable reactors will allow maximum excitation over the entire region of zero power factor over-excited to zero power factor under-excited.

Thus, the output of the rectifier bank 15 supplied to the slip ring and brush arrangement 14 will be responsive both to generator current and generator voltage in a well known compounding effect which can be designed to produce an instantaneous excitation forcing action and a steady state self-regulating action which minimizes generator response time and reduces control requirements.

While one embodiment of this invention has been shown and described, it will be apparent to those skilled in the art that many modifications are possible. The invention, therefore, is not to be restricted except insofar as is necessary by the prior art and by the spirit of the appended claims.

What is claimed as new and desired to be secured by Letters Patent of the United States is:

1. A field excitation circuit for a dynamoelectric machine having a field winding, said field excitation circuit comprising;
   a transformer having a first winding, a second winding, and a third winding, said first, second, and third winding being coupled to one another, said first winding being responsive to armature current provided by said dynamoelectric machine, said second winding being responsive to synchronous flux provided by said dynamoelectric machine, and said third winding developing a voltage responsive to said first and second winding;
   means for rectifying said voltage from said third winding to provide a direct current output;
   means for connecting said direct current output of said rectifying means to said field winding; and
   means for providing a variable reactance in series with said second winding for controlling the amount of current through said second winding.

2. The circuit as in claim 1, wherein said variable reactance means comprises inverse parallel silicon-controlled rectifiers connected in parallel with a reactor.

3. The circuit as in claim 1 wherein said variable reactance means comprises inverse parallel silicon-controlled rectifiers.

4. The circuit as in claim 1, wherein said first, said second, and said third winding form one phase set of a multiphase set of windings, and a reactance means is connected in series with each phase of said second winding.

5. A field excitation circuit for a dynamoelectric machine having a field winding and an electromagnetic stator core, said electromagnetic stator core including a multiphase main armature winding having a neutral lead, and a multiphase supplementary winding having an output, said field excitation circuit comprising the combination of:

a multiphase transformer having a first multiphase winding, a second multiphase winding, and a third multiphase winding, said first, second, and third multiphase winding being coupled to one another, said first multiphase winding being responsive to armature current in said multiphase main armature winding, said second multiphase winding being responsive to synchronous flux provided by said multiphase supplementary winding, and said third multiphase winding developing a voltage substantially responsive to said first and said second mutliphase winding;

means for rectifying said voltage from said third multiphase winding, to provide a direct current output;

means for connecting said direct current output of said rectifying means to said field winding; and means for providing a variable reactance in series with each phase of said second winding for controlling the amount of current therethrough.

6. The combination as in claim 5, wherein said variable reactance means comprises inverse parallel silicon-controlled rectifiers connected in parallel with a reactor.

7. The combination as in claim 5, wherein said variable reactance means comprises inverse parallel silicon-controlled rectifiers.

8. The combination as in claim 5, wherein said first multiphase winding comprises said neutral leads of said main armature winding.

9. The combination as in claim 5, wherein said second multiphase winding is connected in series with said output of said multiphase supplementary winding.

* * * * *